Dec. 10, 1940.  H. A. ACER  2,224,208
CONDUIT SECTION FOR AIR CONDUITS
Filed Aug. 26, 1937
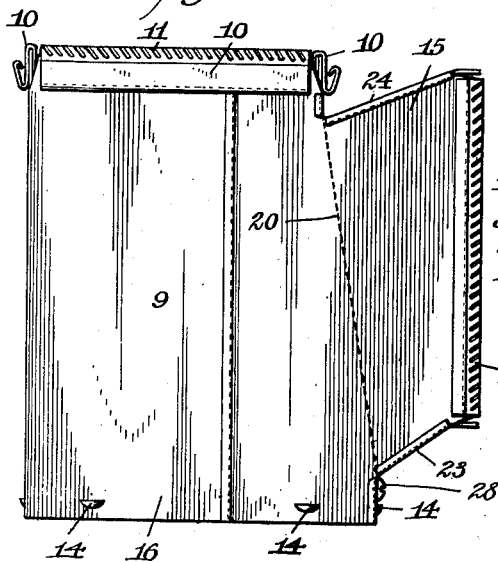
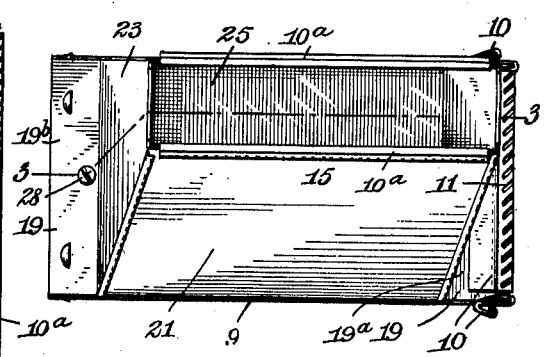
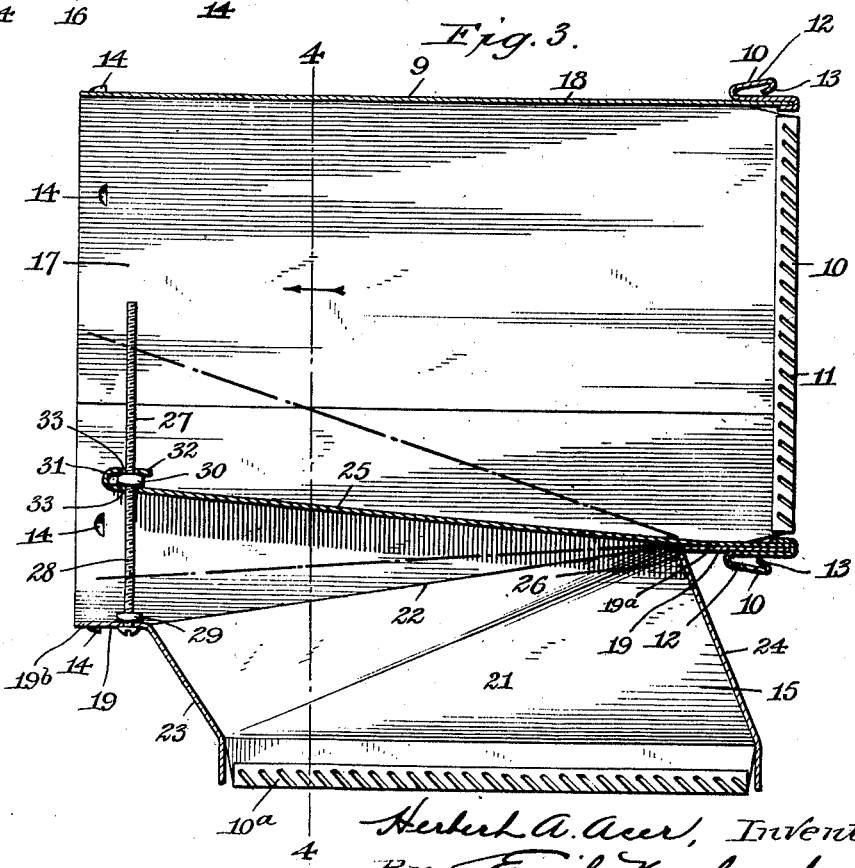
Herbert A. Acer, Inventor.
By Emil Kenhart
Attorney.

UNITED STATES PATENT OFFICE 2,224,208

CONDUIT SECTION FOR AIR CONDUITS

Herbert A. Acer, Medina, N. Y., assignor to Acer & Whedon, Inc., Medina, N. Y., a corporation of New York Application August 26, 1937, Serial No. 160,951

4 Claims. (Cl. 138—37)

My invention relates to improvements in air conduits or flues for hot-air furnaces, and more particularly to a section for such conduits or flues provided with a feeder or a return branch.

Air conduits or flues of the type mentioned are invariably formed in sections, and these sections are comparatively short, particularly such as have branches extending therefrom, either for ingress or egress of air.

One end of the conduit section embodying my invention is preferably of smaller area, or of smaller dimension at least in one direction, than its other end, the small area or dimension being maintained from the small end of the section to the branch, and the larger area or dimension being maintained from the large end of the section to said branch. Thus, at that side of the section from which the branch extends, the conduit is offset and my present invention is particularly adapted for use in sections having such branches and offsets.

One of the objects of my invention is to provide a deflector damper or valve, which I prefer to more particularly term an equalizing damper or valve, for the purpose of directing a definite volume of air into the branch when used as an egress branch, and to definitely govern the volume of air admitted into the conduit through any of the ingress branches.

Another object of my invention is to provide a novel manner of connecting said damper or valve to a wall portion of the conduit, and to provide a novel location for said connection with respect to other parts of the conduit, and particularly the inner end of a branch.

A still further object of my invention is to provide novel means for regulating the damper or valve so that it may be positively maintained in any adjusted position and by means of which adjustment may be effected to the minutest degree.

A still further object of my invention is to provide simple and inexpensive regulating means, easily applicable to the damper or valve and conveniently adjustable in a wall portion of the conduit.

With the above and other objects in view, my invention consists in the novel features of construction and in the arrangement and combination of parts to be hereinafter described and more particularly pointed out in the subjoined claims.

Reference being had to the drawing,

Fig. 1 is a plan view of a conduit section having a branch extending therefrom.

Fig. 2 is a view of that side of the section from which the branch extends.

Fig. 3 is an enlarged horizontal section taken on line 3—3, Fig. 2.

Referring to the drawing, the numeral 9 designates a conduit section considered as a whole. It is of that type in which, at one end of the section, a slip lock-joint is provided by fastening to the walls of the section lock-strips 10 arranged transversely across the walls at one end of the section, the fastening being effected by constructing these lock-strips to embrace the end portions of the walls of the section and clamping or crimping the metal of the lock-strip and the wall portion together, as indicated at 11. These lock-strips are provided on their outer sides with rebent portions 12 recurved at their marginal portions, as at 13, to serve as lock-flanges, the rebent portions 12 providing recesses in the lock-strips to receive wall portions of the adjoining section, said wall portions having lock-lugs 14 stamped therefrom which are adapted to be engaged by the lock-flanges 13. In this manner a tight connection is made between the sections of the conduit.

The section to which I prefer to apply my invention and in connection with which it is most effective is of rectangular formation in cross section, and preferably all sections associated therewith to form an air-conduit are of equal height. All sections of a conduit to which my invention is preferably applied have ingress or egress branches 15 extending laterally therefrom, and each such section is of smaller dimension transversely at one side of the branch than the other. Consequently, the adjoining section of the conduit at one end of the section having the branch is of greater transverse dimension than the adjoining section at the other end thereof, thereby carrying out the inventive thought of increasing the areas of the sections in exact proportion to the air passing through the conduit at various regions in the length thereof, as is well known.

While my invention herein described and particularly pointed out in the appended claims is adaptable for use in connection with conduit sections varying from that shown in the accompanying drawing, it is of particular advantage for use in connection with the section herein illustrated and described, wherein the rectangular body portion of the section has a top wall 16, a bottom wall 17, a straight-lined side wall 18, and an offset side wall 19 formed of two separated parts 19a, 19b, between which the branch 15 opens into the body portion of the section; that that portion 19a of the side wall at one side of said branch being offset with respect to the portion 19ᵇ at the other side of the branch, in consequence of which one end of the section is narrower than the other and the top and bottom walls are gradually widened from the narrow end to the wide end thereof; although in the particular construction shown the top wall of the section is continued outwardly beyond the dotted line 20, Fig. 1, to form the top wall of the branch. I also preferably continue the bottom wall 17 outwardly and upwardly, as at 21, Fig. 4, to form the bottom wall of the branch, although this wall is at an obtuse angle to the bottom wall. These structural features of the invention may, however, be varied as they form no particular part of this invention except to make clear the particular advantages in the use of my invention in connection with this particular type of conduit section.

Like the lock-strip 10 at one end of the body portion of the section, lock-strips 10ᵃ are applied to the upper and lower sides of the branch 15 at their outer ends, it being the intention that the adjacent end of the adjoining section to be attached to the branch be provided with lock-lugs similar to the lock-lugs 14; and it is to be understood that when one end of a section having the lock-lugs 14 stamped therefrom or similar lock-lugs applied thereto or formed thereon, such ends are inserted into the lock-strips behind the rebent portions 12 thereof, and when so positioned these lugs engage behind the lock-flanges or recurved marginal portions 13 of said lock-strips, thereby securely fastening the sections together and completely covering all openings in the end of the section provided with such lock-strips.

In practice I have found that a reduction of two inches in transverse dimension from one end of the section to the other, efficiently meets average requirements for heating, ventilating, or air-conditioning the average building structure, but it is apparent that such dimensions may be varied. Examination of Fig. 3 of the drawing clearly discloses that the side walls of the section are parallel-sided from opposite ends inwardly short distances to the inner open end of the branch 15, and that from the narrow end of the section the latter is gradually widened, as indicated by line 20 in Fig. 1 and line 22 in Fig. 3, to the wide end. Consequently, the opening of this branch into the body portion of the conduit section is at an angle to the longitudinal center of said body portion. It will also be noted from Fig. 3 that the branch has side walls 23, 24 which are inclined to the offset portions 19ᵃ, 19ᵇ of the side wall 19 of the body portion of the section.

In some building structures conditions prevail that prevent the proper distribution of air to the various rooms of the building or to various parts thereof, and I have devised means for more effectively equalizing this distribution. With this end in view I associate with each branch 15, an air-deflecting device which I prefer to term an equalizing damper or valve and designate by the numeral 25. This damper or valve is in the form of a sheet-metal plate having a width to reach from the top to the bottom wall of the body portion of the section with only sufficient clearance at its upper and lower edges to prevent binding of said damper or valve against said walls, and which is of a length to extend along at least a portion of the width of the inner-end opening of the branch 15, but preferably of a width greater than that of the transverse dimension of said opening. This damper or valve is fastened to the wall portion 19ᵃ of the side wall 19 of the body portion of the section, which is closer to the longitudinal center of the section than the wall portion 19ᵇ, or in other words to that portion of the side wall 19 located at the end of the body portion of reduced area. Said damper or valve may be substantially in alinement with said wall portion 19ᵃ, or it may be moved or deflected outwardly toward the inner-end opening of the branch 15, or inwardly toward the longitudinal center of said body portion. In any event it is arranged to confront or extend across the inner-end opening of the branch from the apex 26 formed by the side wall 24 of said branch and the adjacent portion 19ᵃ of the side wall 19 of the body portion.

Since in conduit sections of this type I prefer to employ the lock-strips 10 described, by reason of their effectiveness in connecting conduit sections together and preventing leakage of air at the joints, I utilize the lock-strip associated with the wall portion 19ᵃ for securing the equalizing damper or valve in place. So employed, one end of the damper or valve lies in contact with the inner surface of said wall portion 19ᵃ, and the lock-strip fastened to said wall portion is constructed to embrace both the latter and the extremity of the damper or valve. This damper or valve is therefore fastened at one end to the smaller end of the conduit section and extends toward the larger end thereof, where it is connected with an adjusting device 27 capable of moving or deflecting said damper or valve inwardly or outwardly toward the inner-end opening of the branch 15.

This adjusting device includes a screw-bolt 28 which may be in the nature of an ordinary stove-bolt. In the preferred form this screw-bolt is passed through the portion 19ᵇ of the side wall 19, which is more remote from the longitudinal center of the conduit section than the wall portion 19ᵃ, and extends into the conduit substantially the full length of the bolt. In this construction the head of the screw-bolt bears against the exterior of said wall portion and the bolt is loosely rotatable within said wall portion. The bolt is threaded from its inner end to a point close to the head of the bolt, and a retainer nut 29 is threaded thereon and retained either in contact with the inner side of said wall portion or in close proximity thereto so that little or no longitudinal movement is allowed the bolt. This bolt is passed through a nut 30 which is held immovably to the damper or valve 25, and for this purpose the outer or free end of said damper is recurved, as at 31, to form a retainer flange 32 which bears against the nut 30 and fastens the nut against rotation between said flange and the body of the damper or valve with a view of causing the nut to travel along the screw-bolt when rotating the latter, the valve being provided with alined openings 33 through which the screw-bolt is loosely passed. It will be apparent that the damper or valve is caused to flex either inwardly away from the branch 15 of the conduit section, or outwardly into closer relation to the inner open end of said branch. The degree of adjustment of the damper may therefore be easily varied, and under normal conditions it will be substantially two inches or any other predetermined distance from that portion of the side wall 19ᵇ most remote from the longitudinal center of the section.

Assuming heated air is traveling to the right in Fig. 3, and the damper or valve is in normal position, a predetermined volume of air will enter the section and a definite volume of this air will be directed by this damper or valve 25 into the branch 15. This division of air will take place in each section of the air-conduit having a branch projecting therefrom; and it may here be stated that where a section has branches projecting from opposite sides, such a damper or valve will be provided for each branch, and therefore the proportion of air deflected from the volume entering the section will be double that shown in Fig. 3 of the drawing.

If, for any reason, the quantity of hot air directed into any particular room is to be diminished, the screw-bolt 28 will be rotated in one direction, or to the right as shown in Fig. 3; and when it is found that a room does not receive sufficient heated air, opposite rotation of the screw-bolt will move or deflect the damper or valve inwardly so that the space between the wall portion 19$^b$ and the free end of the damper or valve is increased. By the use of the screw-bolt, an exceedingly fine adjustment of the damper or valve can be made so that the heat throughout the different rooms in a building can be easily balanced.

The manner of securing the damper or valve to a wall of the conduit section illustrated and herein described causes a bending or flexing action of the damper or valve at or near its point of attachment, which assures absolute rigidity of the damper or valve when associated with my improved type of adjusting device; but a hinged or other freely movable connection may be made if desired. Regardless of the form of connection employed for attaching the damper or valve to the wall of the conduit section, my improved adjusting device assures a fixed position of the damper or valve after adjustment of the same, which cannot be varied by any conditions under which air may be directed through the conduit.

Having thus described my invention, what I claim is:

1. A sheet-metal conduit section of rectangular formation in cross section and having a branch extending laterally from one wall thereof, a lock-strip secured to one end of said conduit section for connection of an adjoining conduit section thereto, a damper confronting the inner-end opening of said branch and fastened to the wall of the conduit section having the branch extending therefrom by means of said lock-strip, and an adjusting device for adjusting said damper with respect to the inner end opening of said branch.

2. A conduit section having a lateral branch, a damper confronting the inner-end opening of said branch and secured at one end to a wall of said section at one side of said branch, the opposite end of said damper being recurved to form a retainer flange, a nut held between said retainer flange and the body portion of said damper, and a screw-bolt rotatably and non-longitudinally movable in a wall of the conduit at the other side of said branch and being passed freely through the retainer flange and body portion of said damper and threaded through said nut.

3. A conduit section formed of sheet metal and having a lateral branch, a damper also of sheet metal confronting the inner-end opening of said branch and secured at one end to a wall of said section at one side of said branch, and a screw-bolt mounted in a wall of said conduit at the other side of said branch, said damper having a portion bent therefrom and maintained in spaced relation to the main portion thereof and said screw-bolt having a part positioned in the space located between said bent portion and the main portion of said damper to cause movement of the latter by manipulation of said screw-bolt.

4. A sheet-metal conduit section having a branch extending laterally therefrom, a damper confronting the inner end of said branch, means at one end of said section for connection of an adjoining section thereto, said means serving also to secure the outer end of said damper to the side of said conduit section from which said branch extends, and an adjusting device engaging said damper at a distance from its secured outer end for adjusting said damper with respect to the inner end of said branch.

HERBERT A. ACER.